J. R. LOCKE.
OSCILLATING CUTTER-HEADS FOR FINISHING SPOKES.

No. 189,635. Patented April 17, 1877.

UNITED STATES PATENT OFFICE.

JOSEPH R. LOCKE, OF AMESBURY, MASSACHUSETTS.

IMPROVEMENT IN OSCILLATING CUTTER-HEADS FOR FINISHING SPOKES.

Specification forming part of Letters Patent No. 189,635, dated April 17, 1877; application filed January 19, 1877.

*To all whom it may concern:*

Figure 1:
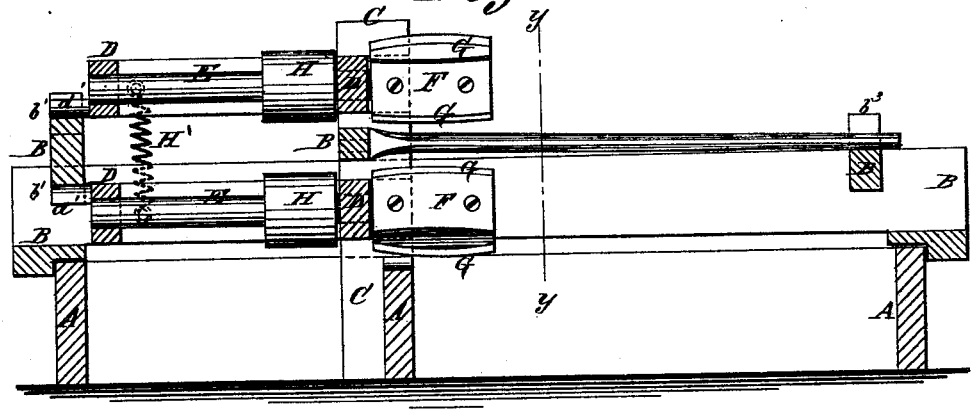
Figure 2:
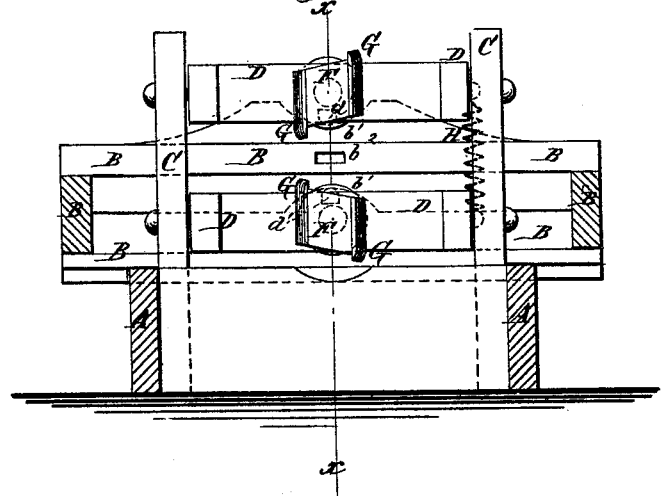

Be it known that I, JOSEPH R. LOCKE, of Amesbury, in the county of Essex and State of Massachusetts, have invented a new and useful Improvement in Oscillating Cutter-Heads for Finishing Spokes, of which the following is a specification:

Figure 1 is a vertical longitudinal section of my improved machine, taken through the line $x\,x$, Fig. 2. Fig. 2 is a vertical cross-section of the same, taken through the line $y\,y$, Fig. 1.

Similar letters of reference indicate corresponding parts.

The object of this invention is to furnish an improved machine, which shall be so constructed that the cutter-heads may be oscillated to bring their cutters into proper position for finishing spokes, and which shall be simple in construction and convenient in use.

The invention will first be described in connection with the drawing, and then pointed out in the claim.

A is the main frame of the machine, upon which is placed a frame, B, constructed to slide longitudinally upon the said frame A.

To the side bars of the frame A are attached two uprights, C, to and between which are pivoted the inner ends of two frames, D, in bearings in which revolve the shafts E. To the forward ends of the shafts E, are attached the cutter-heads F, the cutters G of which are slightly curved, as shown in Fig. 1.

To the rear ends of the two frames D are attached pins $d'$, which rest against the upper and lower edges of the cross-bar of the sliding frame B, against which they are held by the spiral spring $H'$ attached to the said frames D.

In the upper and lower edges of the rear side bar of the frame B are formed curved or inclined guides $b^1$, which, as the sliding frame B is moved back and forth, move the rear ends of the frames D toward and from each other, and thus move the cutter-heads F from and toward each other, to bring the cutters G into proper position for finishing the spokes.

The tenon of the spoke to be finished is placed in a mortise, $b^2$, in the cross-bar of the sliding frame B between the ends of the frames D, so as to bring the part of the spoke to be finished between the cutter-heads F. The other end of the spoke rests upon the forward cross-bar of the frame B, and against a stop, $b^3$, attached to said cross-bar.

To the shafts E are attached pulleys H, to receive the belts by which they are driven from any convenient power.

Having thus described my invention, I claim as new and desire to secure by Letters Patent—

The combination of the sliding frame B, provided with the curved guides $b^1$, the pivoted frames D, the spring $H'$, the shafts E, and the cutter-heads and cutters F G, with each other, and with the uprights C, and the main frame A, substantially as herein shown and described.

JOSEPH RICHARDSON LOCKE.

Witnesses:
JOSEPH T. CLARKSON,
W. T. CLARKSON.